Sept. 25, 1962 F. HAALCK 3,055,218
GRAVIMETER
Filed April 10, 1958
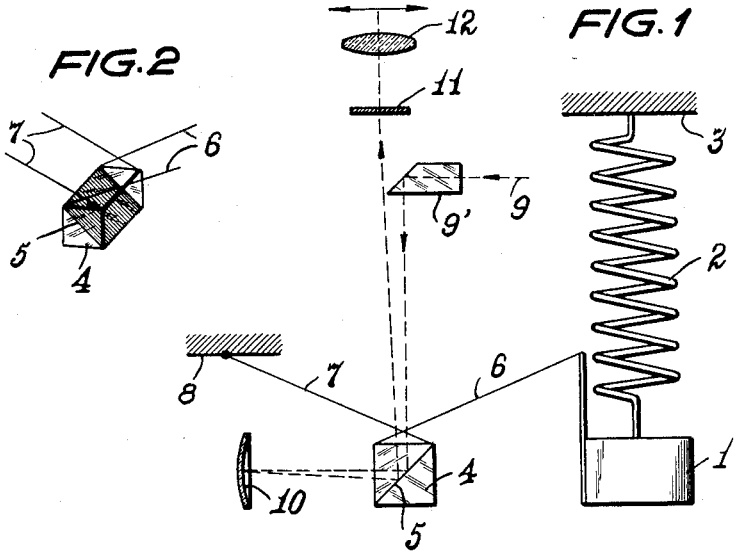
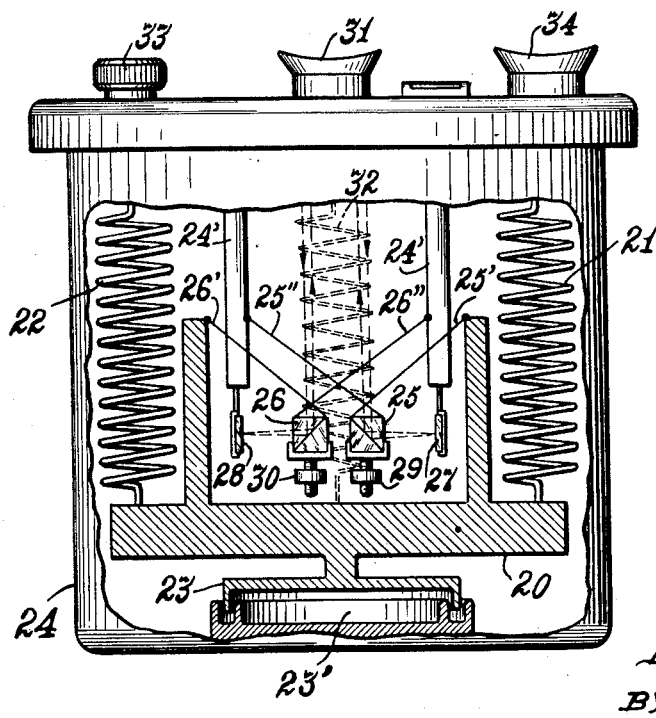
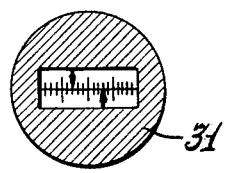
INVENTOR
*Fritz Haalck*
BY
ATTORNEY

3,055,218
GRAVIMETER
Fritz Haalck, Berlin-Wilmersdorf, Germany, assignor to Askania-Werke A.G., Berlin-Friedenau, Germany, a corporation of Germany
Filed Apr. 10, 1958, Ser. No. 727,588
Claims priority, application Germany Apr. 11, 1957
2 Claims. (Cl. 73—382)

This invention relates to gravimeters, particularly of the type wherein a mass is resiliently suspended in basically stationary condition. More particularly the invention relates to means for indicating a displacement of the mass, caused by a change in the force of gravity, and for making the indication more sensitive by exerting incident thereto an astatic effect upon the mass, tending to additionally displace the same. Still more particularly, the astatic effect is produced by means—preferably of mechanical-optical character—which are subject to a minimum of disturbance by forces other than the gravity to be measured; for instance, subject to no geomagnetic disturbance.

The invention will be explained in connection with the drawing appended hereto, wherein FIGURE 1 is a purely schematic diagram of an instrument in accordance herewith; FIGURE 2 is a perspective view of an element of said instrument; FIGURE 3 is a more detailed view of the instrument, in elevation and partly in section; and FIGURE 4 is a fragmentary plan view, showing the field of view of one of the visual observation means forming part of the instrument.

In FIGURE 1 the gravimeter mass 1 is suspended by spring 2 from housing 3. A change in the force of gravity acting on mass 1 causes a change in the length of spring 2, this spring being shown as being of the extension type. For measuring purposes, and in the illustrated embodiment particularly for purposes of visual indication, an indicator element 4 is connected with the mass 1 on the one hand and with a stationary element on the other, in shiftable ways, for magnifying indication of the change in length of spring 2 and for controlled astatic influence thereon. Preferably the indicator element 4 is a reflector pendulum, shown as consisting of two glass prisms cemented together on a mirrorized, common surface 5. Flexible links or filaments such as wires or ribbons 6, 7 connect spaced points on pendulum body 4 with mass 1 and fixed point 8 respectively, the suspension being of the articulated quadrilateral type which has long been used, in connection with problems different from the present ones, in instruments such as seismographs.

The position of mirror surface 5 is observed by optical means of high sensitivity for angular and lateral movements and of low or zero sensitivity for other movements of said surface, preferably by a basically known autocollimator telescope, schematically shown as providing illuminating window means 9′ for the admission of a light pencil 9; a concave mirror 10 which receives this pencil after reflection at 5 and reflects it back to 5; a scale reticle 11; and an ocular 12. The aforementioned changes in length of spring 2, caused by changes in the gravity acting on mass 1, cause displacements of mirror surface 5; particularly, lateral as well as angular and other displacements, depending in detail on the geometry of the suspension system 6, 7 and the location of the center of gravity of pendulum body 4 relative to the said system. Such displacements of surface 5 are magnified and indicated by light pencil 9, in ocular 12.

Incident to these actions, the displacement of surface 5 involves a displacement of the center of gravity of body 4 in directions laterally of the mass 1, toward right or left in the drawing, thereby generating forces which are applied to mass 1 by flexible link 6 and which assist the change of gravity in tending to move the mass, thereby providing an astatic effect. The magnitude of this astatic effect can be made greater or smaller; it depends on the geometry of the quadrilateral suspension and the basic position of the center of gravity of the pendulum 4. It is known to be possible to place the said pendulum in stable, labile or indifferent equilibrium and to make the stable or labile condition more or less pronounced. For present purposes it is often preferable to utilize only limited or even extremely limited astatic effects, for instance, a low degree of lability of pendulum 4 at least within a certain range of movement thereof.

It will be understood that the different degrees of either stable or labile equilibrium of pendulum 4 affect, among other things, the oscillating characteristics of this body, thereby also affecting the behavior of light pencil 9 in ocular 12.

The gravimeter according to the schematic FIGURE 1 is subject to one serious drawback, which however can be avoided, for instance by the system of FIGURE 3. Here a gravimeter mass 20 is not only suspended by a plurality of springs 21, 22, with damping means 23, 23′ in housing 24; it is furthermore provided with a pair of indicator pendulum means 25 and 26, suspended respectively by quadrilaterally articulated wire systems 25′, 25″ and 26′, 26″ which again are connected to mass 20 and a part 24′ of the rigid housing. More particularly the present double suspension is such that gravitational displacements of mass 20 move the two pendulums in opposite directions. It is further preferred to provide each pendulum 25, 26 with vertically adjustable weight means 29, 30 for adjusting the centers of gravity, and to provide, at the same time, suitable sensitivity by such adjustments.

Two light pencils are used in this embodiment, which in this case can be traced from reflectors 25, 26 respectively to stationary mirrors 27, 28, back to 25, 26 and into the ocular of reading microscope 31, wherein they may appear as the arrows visible in FIGURE 4. Due to their mutually opposed reaction to gravitational shifts they move symmetrically apart or toward one another, thereby doubling the amplitude of indication otherwise obtained by the spring means, the astatic effects and the optics employed and at the same time mutually compensating the disturbing effects of tilting movements which the entire instrument may have undergone after original setting up and before the actual observation. Such tilting movements merely displace both light pencils in uniform —not countercurrent—directions, in ocular 31, whereas the gravitational change, as mentioned, causes countercurrent displacements. Thus the tilting of the instrument no longer affects the coincidence of the light pencils, desired in zero position; moreover the adjustment of the indicator means is simplified by the arrangement shown and described.

The said zero position is established and re-established by means which include a soft return or zeroing spring 32, anchored to mass 20 at a point which in FIGURE 3 appears behind the prism system 25, 26; said zeroing spring having an upper end, not shown, which may be secured in known manner to means controlled by a micrometer device 33, observed through reading microscope 34. These and other details of the instrument, including also the means for suitably combining pencils of light in ocular 31, need not be shown or described as they are well known, as such.

Numerous modifications are possible, for instance as to details of the quadrilaterally articulated pendulum suspensions, one of which is shown with crossed wires of slight inclination from the horizontal in FIGURE 2;

steeply inclined or non-crossing wires or ribbons may be used, among other variants. Other modifications are possible as to the spring means used, as to the astatic effects obtained by the cooperating means and as to the optical and/or astatic-mechanical amplification of the spring displacement. In each case, however, disturbances such as those suffered by photoelectrical or magnetic means are avoided, particularly in the most sensitive portion of the instruments where minute forces play in the suspending system.

I claim:

1. In a gravimeter, a normally stationary but at least minutely tiltable structure, gravimeter springs having their upper ends secured to said structure, a gravimeter mass supported by the lower end of said springs for vertical displacement upon a change of the force of gravity acting on said mass and for lateral shifting in response to minute tilting of the structure, a mechanism adapted to amplify said displacements, said mechanism comprising a pair of first flexible means connected to and depending from said mass, a pair of second flexible means connected to and depending from said structure and spaced from said first flexible means, pendulum bodies one arranged between a first and second flexible means of each pair and each body having spaced portions secured respectively to the lower free ends of the respective flexible means and suspended thereby, each of said first flexible means intersecting a related one of said second flexible means between their ends, and optical means on and movable with each pendulum body for directing a light beam in response to movements of the so suspended pendulum body, said optical means being movable in opposite directions in response to gravitational displacement of the mass and in like directions to compensate for dynamic influences of inclination.

2. In a gravimeter, a normally stationary but at least tiltable structure, spring means connected at one end to said structure, a gravimeter mass supported by the other end of said spring means for vertical displacement upon a change of force of gravity acting on said mass, said mass being subjected to lateral displacement upon any tilting of the structure; and a mechanism for indicating said vertical displacement without disturbance by said other displacement, said mechanism comprising: first and second pendulum bodies, each having at least a pair of suspension points, first and second suspension systems having at least two flexible filaments each, at least one of the filaments of each system being secured to and depending from said structure and at least one filament of each being secured to and depending from the mass, the lower ends of said filaments in each system being secured to said suspension points of one of said pendulum bodies, the filaments of the first system being dimensioned and oriented generally similar to the corresponding filaments of the second system, and indicator means jointly responsive to relative displacement of the suspension points of the so suspended pendulum bodies, said indicator means comprising reflector means on each of said pendulum bodies; a reading device on said structure and reflector means on said structure, and means for directing light beams over paths which include extending the light beams from each reflector means on the structure to the reflector means on the bodies for reflection into said reading device, said pendulum bodies being movable in opposite directions in response to gravitational displacement of the mass and in like directions to compensate for dynamic influence of tilting.

References Cited in the file of this patent

UNITED STATES PATENTS

| 2,143,011 | DeJuhasz | Jan. 10, 1939 |
| 2,232,177 | Ide | Feb. 18, 1941 |
| 2,296,330 | Blau | Sept. 22, 1942 |

FOREIGN PATENTS

| 160,327 | Austria | Apr. 25, 1941 |